US011283626B2

(12) United States Patent
Lian et al.

(10) Patent No.: US 11,283,626 B2
(45) Date of Patent: Mar. 22, 2022

(54) APPARATUS AND METHODS FOR DISTRIBUTED CERTIFICATE ENROLLMENT

(71) Applicant: Huawei Technologies Co., Ltd., Shenzhen (CN)

(72) Inventors: Gang Lian, Helsinki (FI); Sampo Sovio, Helsinki (FI); Taisheng Deng, Shenzhen (CN); Xiaopu Wang, Beijing (CN); Zongbo Ye, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 107 days.

(21) Appl. No.: 16/331,055

(22) PCT Filed: Sep. 6, 2016

(86) PCT No.: PCT/EP2016/070936
§ 371 (c)(1),
(2) Date: Mar. 6, 2019

(87) PCT Pub. No.: WO2018/046073
PCT Pub. Date: Mar. 15, 2018

(65) Prior Publication Data
US 2019/0238342 A1 Aug. 1, 2019

(51) Int. Cl.
*H04L 9/32* (2006.01)
*H04L 29/06* (2006.01)
*H04L 9/08* (2006.01)

(52) U.S. Cl.
CPC .......... *H04L 9/3263* (2013.01); *H04L 9/0894* (2013.01); *H04L 9/321* (2013.01);
(Continued)

(58) Field of Classification Search
CPC ..... H04L 9/3263; H04L 9/0894; H04L 9/321; H04L 63/0823; H04L 2209/64; H04L 2209/80; H04L 2463/061
See application file for complete search history.

(56) References Cited

U.S. PATENT DOCUMENTS 4,811,393 A * 3/1989 Hazard .............. G06Q 20/3672
380/277
6,839,841 B1 1/2005 Medvinsky et al.
(Continued)

FOREIGN PATENT DOCUMENTS

CN 101136743 A 3/2008
CN 101150533 A 3/2008

OTHER PUBLICATIONS

Foreign Communication From A Counterpart Application, PCT Application No. PCT/EP2016/070936, English Translation of International Search Report dated Jul. 11, 2017, 8 pages.
(Continued)

*Primary Examiner* — Carl G Colin
*Assistant Examiner* — Zhe Liu
(74) *Attorney, Agent, or Firm* — Conley Rose, P.C.

(57) ABSTRACT

An apparatus including a processor and a memory, where the processor and the memory are configured to provide a secure execution environment and the memory stores a hardware unique key and a class key. The processor is configured to recover, in the secure execution environment, a certificate signing key based on the class key, where the certificate signing key is associated with a certificate authority. The processor is further configured to derive a device key pair based on the hardware unique key, where the device key pair includes a device public key and a device private key, and generate a device certificate based on the device public key and the certificate signing key. The generated device cer-
(Continued)

tificate is configured to be validated based on a public key associated with the certificate authority.

16 Claims, 6 Drawing Sheets

(52) U.S. Cl.
CPC ...... *H04L 63/0823* (2013.01); *H04L 2209/64* (2013.01); *H04L 2209/80* (2013.01); *H04L 2463/061* (2013.01)

(56) References Cited

U.S. PATENT DOCUMENTS

| | | | | |
|---|---|---|---|---|
| 6,968,060 | B1* | 11/2005 | Pinkas | H04L 9/30 380/277 |
| 7,823,192 | B1* | 10/2010 | Fultz | G06F 21/33 726/7 |
| 7,974,415 | B2* | 7/2011 | Nochta | H04L 9/3236 380/277 |
| 2003/0005317 | A1 | 1/2003 | Audebert et al. | |
| 2003/0081785 | A1* | 5/2003 | Boneh | H04L 9/0847 380/277 |
| 2003/0115455 | A1 | 6/2003 | Aull et al. | |
| 2006/0085634 | A1 | 4/2006 | Jain et al. | |
| 2008/0044032 | A1* | 2/2008 | Lou | H04L 65/40 380/284 |
| 2008/0162947 | A1* | 7/2008 | Holtzman | G06F 21/10 713/193 |
| 2012/0303950 | A1* | 11/2012 | Qu | H04L 9/3247 713/156 |
| 2015/0100793 | A1* | 4/2015 | Newell | H04L 9/3263 713/189 |
| 2015/0222517 | A1* | 8/2015 | McLaughlin | G06F 21/445 713/156 |
| 2016/0134621 | A1* | 5/2016 | Palanigounder | H04L 9/3268 713/156 |
| 2016/0330036 | A1* | 11/2016 | Zhou | H04L 9/3268 |
| 2017/0214662 | A1* | 7/2017 | Chu | H04L 63/0823 |
| 2018/0375667 | A1* | 12/2018 | Sovio | H04L 9/0825 |

OTHER PUBLICATIONS

Foreign Communication From A Counterpart Application, PCT Application No. PCT/EP2016/070936, English Translation of Written Opinion dated Jul. 11, 2017, 13 pages.

* cited by examiner

APPARATUS AND METHODS FOR DISTRIBUTED CERTIFICATE ENROLLMENT

CROSS-REFERENCE TO RELATED APPLICATIONS

This application is a U.S. National Stage of International Patent Application No. PCT/EP2016/070936 filed on Sep. 6, 2016, which is hereby incorporated by reference in its entirety.

TECHNICAL FIELD

The aspects of the present disclosure relate generally to public key cryptosystems and more particularly to the generation and enrollment of digital certificates.

BACKGROUND

The need for secure communication over data networks has led to a proliferation of public key cryptosystems which may be used to authorize devices, exchange keys, and encrypt, sign, and decrypt data being exchanged over a public network or stored in an unsecure data store. Public key cryptosystems are based on asymmetric cryptographic algorithms where one key is used to encrypt data and the second key is used to decrypt the data. Importantly, the key used to encrypt the data cannot be used to decrypt the data. Thus, by keeping one key private and making the second key publicly available, any entity with the public key can encrypt information they wish to keep confidential and only the entity having access to the corresponding private key can decrypt that data.

Before encrypting sensitive data it is important to be sure the public key being used actually belongs to the intended party and is not a counterfeit supplied by an attacker. In a modern public key infrastructure (PKI) this assurance is provided through the use of a digital certificate. A digital certificate is a digital document including a digital signature to cryptographically bind a public key with associated entity information. Because the certificate is issued, by a known certificate authority (CA), the signature included in the digital certificate can be verified using the public key of the issuing CA. Thus an entity that trusts the CA can establish trust in the digital certificate.

Nearly every computing device in use today requires secure communication and therefore will need to have a trusted device certificate for distributing its public key. Managing cryptographic keys and issuing certificates to every device from every manufacturer can be a difficult task. To facilitate issuing certificates a public key infrastructure (PKI) is used to create a hierarchy of CAs such that a root CA signs certificates for subordinate or intermediate CAs which can in turn issue certificates to end entities or to additional subordinate CAs. In a PKI each certificate includes information identifying the issuing CA thereby allowing verification of the issuing CA's certificate before verifying the subject certificate. In this fashion a certificate can be verified by verifying the chain of certificates until a trusted CA is found or until a trusted root CA is reached. This is referred to as a chain of trust.

Deploying a PKI capable of issuing a certificates to every manufactured device requires multiple CAs distributed around the globe and can therefore be a very complex and expensive task. In typical PKIs the CAs are available only at manufacturing and repair facilities thereby complicating the device lifecycle by requiring each device be physically shipped to or securely connected to a secure facility whenever a new certificate is required. Thus there is a need for simple and low cost means for issuing device certificates that are not constrained to manufacturing and repair facilities.

Accordingly, it would be desirable to provide methods and apparatus that addresses at least some of the problems identified above.

SUMMARY

It is an object of the invention to provide simple and low cost apparatus and methods for issuing device certificates to large numbers of devices where certificate creation is not constrained to manufacturing and repair facilities. This object is solved by the subject matter of the independent claims. Further advantageous modifications can be found in the dependent claims.

According to a first aspect of the invention the above and further objects and advantages are obtained by an apparatus that includes a processor and a memory, where the processor and the memory are configured to provide a secure execution environment and the memory stores a hardware unique key and a class key. The processor is configured to recover in the secure execution environment a certificate signing key based on the class key, wherein the certificate signing key is associated with a certificate authority. The processor derives a device key pair based on the hardware unique key, wherein the device key pair includes a device public key and a device private key, and generates a device certificate based on the device public key and the certificate signing key. The generated device certificate is configured to be validated based on a public key associated with the certificate authority. The aspects of the disclosed embodiments provide a simple and low cost means for issuing device certificates that are not constrained to manufacturing and repair facilities.

In a first possible implementation form of the apparatus according to the first aspect the processor is configured to generate a certificate signing request based on the device public key and the device private key, and generate the device certificate based on the certificate signing request and the certificate signing key. This allows incorporation of trusted CSRs into the novel certificate generation and enrollment apparatus.

In a second possible implementation form of the apparatus according to the first aspect as such or according to the first possible implementation form of the first aspect the memory comprises a class diversifier value and the processor is configured to recover the certificate signing key based on the class key and the class diversifier value. This facilitates moving the apparatus from one PKI associated with one CA to a different CA or different PKI by updating the class diversifier value and generating a new certificate based on the updated class diversifier value.

In a third possible implementation form of the apparatus according to the first aspect as such or according to the first or second possible implementation forms of the first aspect the memory comprises a device diversifier value, and the processor is configured to derive the device key pair based on the hardware unique key and the device diversifier value. This allows the device key pair to be changed, and because the device diversifier is not confidential the device key pair may be changed without returning the apparatus to a manufacturing or repair facility.

In a fourth possible implementation form of the apparatus according to the first aspect as such or according to the third possible implementation form the processor is configured to update the device diversifier value, derive an updated device key pair based on the hardware unique key and the updated device diversifier value, wherein the updated device key pair comprises an updated device public key and an updated device private key, and generate an updated device certificate based on the updated device public key and the certificate signing key. The updated device certificate has the advantage of publishing a new device public key in a certificate that is enrolled in the PKI of the CAI.

In a fifth possible implementation form of the apparatus according to the first aspect as such or according to the second through fourth possible implementation forms of the first aspect the processor is configured to update the class diversifier value, recover an updated certificate signing key based on the updated class diversifier value and the class key, wherein the updated certificate signing key is associated with a second certificate authority, and generate an updated device certificate based on the updated certificate signing key, wherein the updated device certificate is configured to be validated based on a public key associated with the second certificate authority. This allows generating a device certificate that is enrolled in a PKI associated with a second CA by updating a public value, which may be done without returning the apparatus to a manufacturing or repair facility.

In a sixth possible implementation form of the apparatus according to the first aspect as such or according to any of the preceding possible implementation forms of the first aspect the certificate signing key is recovered based on white box decryption. The use of white box decryption simplifies the security requirements placed on the secure memory.

In a seventh possible implementation form of the apparatus according to the first aspect as such or according to any of the preceding possible implementation forms of the first aspect the device key pair is derived based on white box decryption. The use of white box decryption simplifies the security requirements placed on the secure memory.

In an eighth possible implementation form of the apparatus according to the first aspect as such or according to any of the preceding possible implementation forms of the first aspect the apparatus is a mobile phone or mobile computing device. Mobile devices are particularly well suited to benefit from the distributed certificate enrollment disclosed herein due to the global nature of their manufacture and deployment.

According to a second aspect of the invention the above and further objects and advantages are obtained by an apparatus that includes a processor coupled to a memory and a hardware security device, wherein the processor and the memory are configured to provide a secure execution environment. The processor is configured to in the secure execution environment receive a certificate signing key from the hardware security device, wherein the certificate signing key is associated with a certificate authority processor derives a device key pair based on a device private key, wherein the device key pair includes a device public key and the device private key, and the processor generates a device certificate based on a device public key and the certificate signing key, wherein the device certificate is configured to be validated based on a public key associated with the certificate authority. The use of a hardware security device provides an alternate way to protect and distribute the confidential class key.

In a first possible implementation form of the apparatus according to the second aspect the processor is configured to receive within the secure execution environment the device private key from the hardware security device. The use of a hardware security device provides an alternate way to protect and distribute the device private key.

According to a third aspect of the invention the above and further objects and advantages are obtained by an apparatus including a processor and a memory, wherein the processor and the memory are configured to provide a secure execution environment. The memory stores a hardware unique key and a shared secret. The processor is configured to in the secure execution environment derive a device key pair based on the hardware unique key. The device key pair includes a device public key and a device private key. The processor generates a certificate signing request based on the device public key and the device private key, derives a message authentication code key based on the shared secret, and generates a message authentication code based on the message authentication code key and the certificate signing request. The processor transmits the certificate signing request and the message authentication code to a certificate authority, and receives a device certificate from the certificate authority. The device certificate is configured to be validated based on a public key associated with the certificate authority.

According to a fourth aspect of the invention the above and further objects and advantages are obtained by a method for generating a device certificate performed within a secure execution environment of an apparatus. The method includes recovering a certificate signing key based on a class key, wherein the certificate signing key is associated with a certificate authority, and deriving a device key pair based on a hardware unique key, wherein the device key pair comprises a device public key and a device private key. The method generates a device certificate based on the device public key and the certificate signing key, wherein the device certificate is configured to be validated based on a public key associated with the certificate authority. The aspects of the disclosed embodiments provide a simple and low cost means for issuing device certificates that are not constrained to manufacturing and repair facilities.

In a first implementation form of the method according to the third aspect the certificate signing key is recovered based on the class key and a class diversifier value. This facilitates moving the apparatus from one PKI associated with one CA to a different CA or different PKI by updating the class diversifier value and generating a new certificate based on the updated class diversifier value.

In a second possible implementation form of the third aspect as such or according to the first implementation form of the third aspect the device key pair is derived based on the hardware unique key and a device diversifier value. This allows the device key pair to be changed, and because the device diversifier is not confidential the device key pair may be changed without returning the apparatus to a manufacturing or repair facility.

In a third possible implementation form of the third aspect as such or according to the first or second possible implementation forms of the third aspect the method includes generating a certificate signing request based on the device public key and the device private key, and generating the device certificate based on the certificate signing request and the certificate signing key. This allows incorporation of trusted CSRs into the novel certificate generation and enrollment apparatus.

According to a fifth aspect of the invention the above and further objects and advantages are obtained by a method for generating a device certificate performed within a secure execution environment of an apparatus. The method includes receiving a certificate signing key from a hardware security device, wherein the certificate signing key is associated with a certificate authority, and deriving a device key pair based on a hardware unique key, wherein the device key pair comprises a device public key and a device private key. A device certificate is then generated based on the device public key and the certificate signing key. The device certificate is configured to be validated based on a public key associated with the certificate authority. The aspects of the disclosed embodiments provide a simple and low cost means for issuing device certificates that are not constrained to manufacturing and repair facilities, and provides further security be protecting the confidential key material within a hardware security device.

According to a sixth aspect of the invention the above and further objects and advantages are obtained by a method for generating a device certificate performed within a secure execution environment of an apparatus. The method begins by deriving a device key pair based on a hardware unique key, wherein the device key pair includes a device public key and a device private key. A certificate signing request is then generated based on the device public key and the device private key, and a message authentication code key is derived based on a shared secret. The message authentication code key is then used to generate a message authentication code associated with the certificate signing request and the certificate signing request and the message authentication code are transmitted to a certificate authority. A device certificate is received from the certificate authority, where the device certificate is configured to be validated based on a public key associated with the certificate authority. The aspects of the disclosed embodiments provide a simple and low cost means for issuing device certificates that are not constrained to manufacturing and repair facilities.

According to a seventh aspect of the invention the above and further objects and advantages are obtained by a computer program including non-transitory computer program instructions that when executed by a processor cause the processor to perform the method according to any of the fourth through sixth aspects.

According to an eighth aspect of the invention the above and further objects and advantages are obtained by a processor used in an apparatus including a memory. The processor and the memory are configured to provide a secure execution environment, and the memory stores a hardware unique key and a class key. The processor is configured to in the secure execution environment recover a certificate signing key based on the class key, where the certificate signing key is associated with a certificate authority. The processor derives a device key pair based on the hardware unique key where the device key pair includes a device public key and a device private key. The process then generates a device certificate based on the device public key and the certificate signing key. The device certificate is configured to be validated based on a public key associated with the certificate authority. The aspects of the disclosed embodiments provide a simple and low cost means for issuing device certificates that are not constrained to manufacturing and repair facilities.

According to a ninth aspect of the invention the above and further objects and advantages are obtained by a processor used in an apparatus including a memory. The processor and the memory are configured to provide a secure execution environment, and the memory stores a hardware unique key. A hardware security device is coupled to the processor and the processor is configured to in the secure execution environment receive a certificate signing key from the hardware security device, where the certificate signing key is associated with a certificate authority. The processor derives a device key pair based on the hardware unique key, where the device key pair includes a device public key and the device private key. The processor then generates a device certificate based on the device public key and the certificate signing key, where the device certificate is configured to be validated based on a public key associated with the certificate authority. The aspects of the disclosed embodiments provide a simple and low cost means for issuing device certificates that are not constrained to manufacturing and repair facilities.

According to a tenth aspect of the invention the above and further objects and advantages are obtained by a processor used in an apparatus including a memory. The processor and the memory are configured to provide a secure execution environment, and the memory stores a hardware unique key and a shared secret. The processor is configured to in the secure execution environment derive a device key pair based on the hardware unique key, where the device key pair includes a device public key and a device private key. The processor then generates a certificate signing request based on the device public key and the device private key, derive a message authentication code key based on the shared secret, and generates a message authentication code based on the message authentication code key and the certificate signing request. The processor transmits the certificate signing request and the message authentication code to a certificate authority, and receives a device certificate from the certificate authority, where the device certificate is configured to be validated based on a public key associated with the certificate authority. The aspects of the disclosed embodiments provide a simple and low cost means for issuing device certificates that are not constrained to manufacturing and repair facilities.

BRIEF DESCRIPTION OF THE DRAWINGS

In the following detailed portion of the present disclosure, the invention will be explained in more detail with reference to the example embodiments shown in the drawings, in which.

DETAILED DESCRIPTION OF THE DISCLOSED EMBODIMENTS

Figure 1:
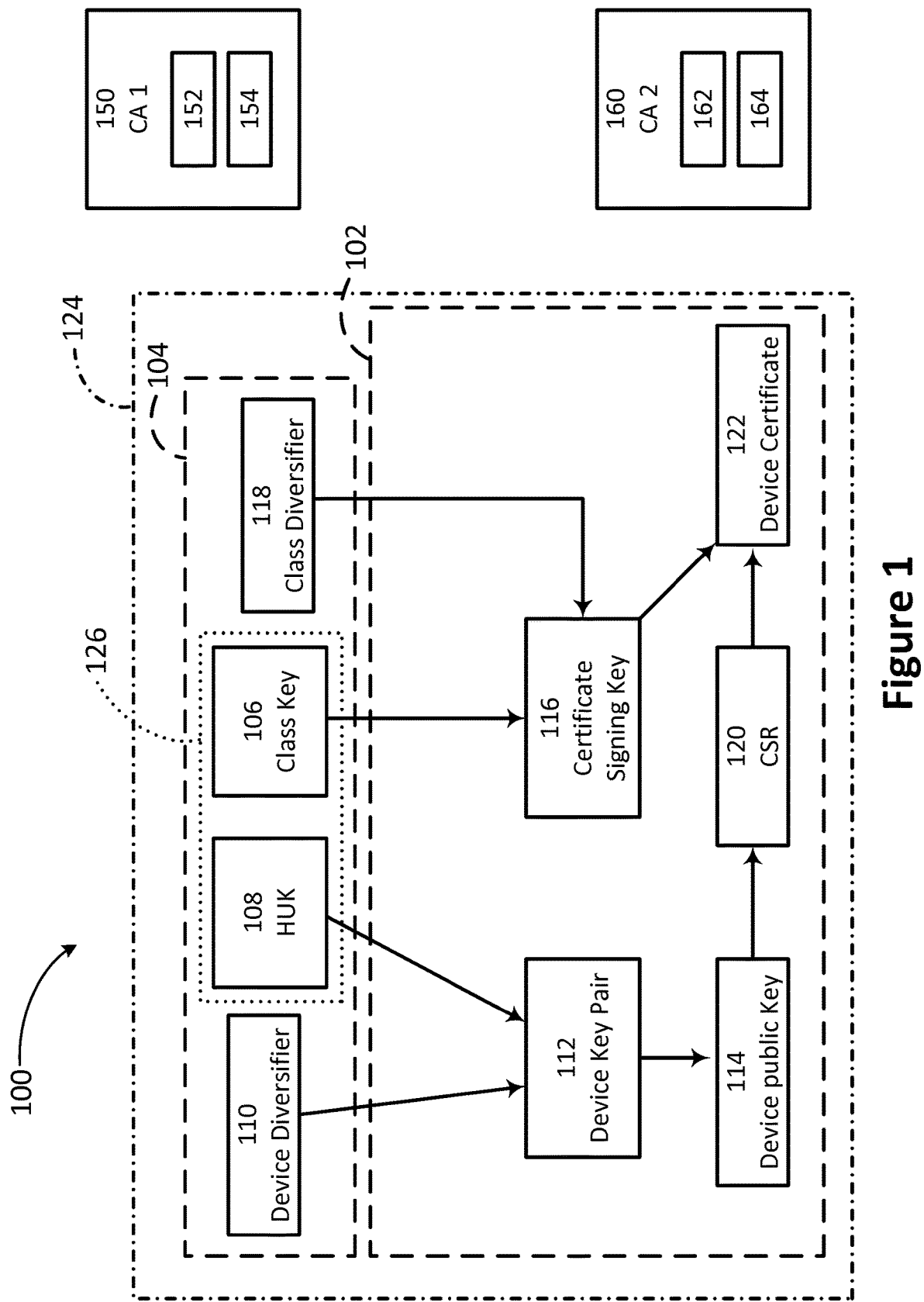
FIG. 1 illustrates a block diagram of an exemplary apparatus configured to generate its own trusted device certificate according to aspects of the disclosed embodiments.

FIG. 1 illustrates a block diagram of an exemplary apparatus 100 configured to generate its own trusted device certificate 122 where the internally generated and signed device certificate 122 may be validated based on the public key from an associated certificate authority 150. The aspects of the disclosed embodiments are configured to provide a secure execution environment (SEE) 124 that can protect the confidentiality and integrity of data and programs stored and/or executing within the SEE 124.

Referring to FIG. 1, the apparatus 100 includes a processor 102 and a memory 104. According to the aspects of the disclosed embodiments, the processor 102 and the memory 104 are configured to provide a secure execution environment 124. In the example of FIG. 1, the memory 104 comprises a hardware unique key 108 and a class key 106.

The processor 102 is configured to, in the secure execution environment 124 recover a certificate signing key 116 based on the class key 106. The certificate signing key 116 is associated with a certificate authority (CA) 150. The processor 102 is configured to derive a device key pair 112 based on the hardware unique key 108. The device key pair 112 comprises a device public key 114 and a device private key. The processor 102 is also configured to generate a device certificate 122 based on the device public key 114 and the certificate signing key 116, wherein the device certificate 122 is configured to be validated based on a public key 154 associated with the certificate authority 150.

In the example of FIG. 1, the SEE 124 provides a computing environment that includes the processor 102 connected to the memory 104. The memory 104 is configured to store data and program instructions that when executed by the processor 102 cause the processor to generate the device certificate 122. The SEE 124 may be implemented as a separate hardware device such as a secure entity (SE) or other suitable hardware security device configured to provide programmatic, electromagnetic, and/or physical security as desired.

One example of an appropriate SEE 124 would be the CryptoCell™ hardware technology offered by ARM Holdings plc. Alternatively the SEE 124 may be provided by a secure portion of the main processor 102 and memory 104 of the computing apparatus 100 such as a mobile phone or other mobile or fixed computing device configured to include a trusted execution environment (TEE) or other appropriate SEE. In certain embodiments the SEE 124 may incorporate a secure file system in user space (FUSE™). In certain embodiments it is advantageous to configure a portion of the (computer) memory 104 as a secure storage area 126 configured to protect the confidentiality of key material stored in the secure storage area 126.

The secure storage area 126, also referred to herein as secure memory 126, can be a physically and electrically secure type of non-volatile or battery backed up computer memory. An example of a suitable secure memory 126 is a one-time programmable (OTP) memory as is used in certain trusted execution environments.

The computing apparatus 100 includes a mechanism where operations, such as issuing device certificates, typically performed by the certificate authority 150 may be delegated or distributed to end user entities that include an appropriately secure SEE 124. The mechanism is based on an ability of the apparatus 100 to gain access to the certificate signing key 152 used by an associated CA 150 and sign its own device certificate 122.

In certain embodiments it is desirable that the SEE 124, i.e. the software applications running on the processor 102 within the SEE 124, are configured to sign a device certificate 122 only for itself and not to use the certificate signing key 116 to issue device certificates for other devices or for any other purpose. For this reason the SEE 124 should verify that the subject information, such as the subject name (SN) or device identifier, being incorporated into the device certificate 122 matches the apparatus's 100 own unique SN or device identifier or other information unique to the specific apparatus 100. In embodiments where the SEE 124 is part of a general purpose computing apparatus, such as in a TEE, it is important that the certificate signing key 116 be hidden from applications executing in a rich execution environment or user space and be restricted to trusted applications executing in the SEE 124 and may when desired be restricted only for signing the apparatus's 100 own device certificate 122.

The certificate signing key 116 and the private key portion of the device key pair 112 are sensitive confidential values. In certain embodiments it is desirable to protect these values using a hardware security device. Alternatively, white box cryptographic techniques may be used. White box techniques are where the certificate signing key 116, and or the device private key are stored in encoded form and only the SEE 124 is able to decrypt the stored cypher text to recover the confidential key material. A third alternative, which will be described in more detail below, is to store a hidden seed value, such as the class key 106 and/or a hardware unique key (HUK) 108, and use a proprietary key derivation processes to recover the certificate signing key 116 and/or the device key pair 112.

In embodiments where the certificate signing key 116, and optionally the device key pair 112, are derived or recovered from confidential data, the confidential data is securely loaded into secure memory 126 of the apparatus 100 when the apparatus 100 is manufactured or provisioned. This confidential data includes a hardware unique key 108 and a class key 106 which are key material that may be used to derive or recover cryptographic keys such as a Rivest™, Shamir™, Adleman™ (RSA) type cryptographic key or an elliptic curve cryptography (ECC) key, or other appropriate asymmetric or symmetric cryptographic key. The HUK 108 and class key 106 are used, as will be discussed further below, as key material in key derivation processes and may themselves be fully formed cryptographic keys, or alternatively may be any appropriate key material from which a suitably strong cryptographic key may be derived.

As used herein the terms manufacturing environment and manufacturing time refer to the secure environment in which the apparatus, such as apparatus 100, is manufactured and loaded with confidential data including the applications that run within the SEE 124. Manufacturing time includes manufacture of components or chipsets used when manufacturing the apparatus 100. These chipsets, sometimes referred to as a system on chip (SoC), often include a one-time programmable (OTP) memory appropriate for use as the secure memory 126. Provisioning, as used herein, is the process of loading confidential data and applications into the SEE 126 and may be done during or after manufacturing. However, as used herein, no distinction is made between manufacturing and provision and the terms are used interchangeably herein to refer to a time or environment capable of securely loading data and program code into the SEE 124.

The processor 102 is configured to derive a device key pair 112 based on the HUK 108 and optionally a device diversifier value 110. The device diversifier value 110 is cryptographic salt used to add diversity to the HUK 108 key material and is a public value that can be updated as desired during the lifecycle of the apparatus 100 thereby allowing the apparatus 100 to generate a new device key pair 112 and new device certificate 122 as desired throughout the lifecycle of the apparatus 100. Changing the device key pair 112 may be desirable for example when the ownership or security role of the apparatus 100 is changed. The diversifier value 110 may be a public value thereby allowing the device key pair 112 to be changed without returning the device to a secure facility or establishing secure communication with a secure facility.

A device public key 114 is extracted from the device key pair 112 to be used as the device public key 114 of the apparatus 100. This public key 114 is incorporated into a certificate signing request (CSR) 120 along with other information such as subject information, security policies, and security roles as desired. The CSR 120 should include information that uniquely identifies the apparatus 100, such as a subject name that may include a unique device identifier assigned to the device during provisioning. The processor 102 can then verify the CSR belongs to the subject device in embodiments where it is desired to prevent the apparatus 100 from issuing certificates for other possibly malicious devices.

The CSR 120 can be any suitable type of CSR 120 such as a public key cryptography standard number ten (PKCS#10) type CSR which is signed with the private key of the device key pair 112. Alternatively, because the CSR 120 never leaves the SEE 124 certain embodiments may skip signing of the CSR 120. The CSR 120 includes data to be incorporated in the device certificate 122 and may be configured in any suitable format and need not conform to any industry standards or be cryptographically signed.

In conventional cryptographic systems the CSR 120 is provided to a trusted CA 150 to obtain a device certificate that is enrolled in a PKI. However, establishing a secure communication link with a CA and obtaining a device certificate 122 can significantly complicate and prolong creation and provisioning of a device certificate 122. To avoid the problems associated with the conventional process where a separate CA 150 is used to issue device certificates 122 for every apparatus 100, the disclosed embodiments may be advantageously employed to delegate or distribute generation of the device certificate 122 to each end user nodes and enable the apparatus 100 to issue its own device certificate 122. Delegating certificate generation is accomplished by configuring the apparatus 100 to recover a certificate signing key 116, based on the class key 106 and optionally a class diversifier value 118, where the certificate signing key 116 is the same certificate signing key 152 used by the CA 150 to issue device certificates.

In certain embodiments it is desirable to use the same class key 106 and/or same class diversifier 118 in an entire class or group of devices thereby enabling all apparatus 100 with the same class key 106 and class diversifier value 118 to enroll themselves in the same PKI. For example all cell phones sold by a particular cell phone company could have the same class key 106 and class diversifier value 118. Alternatively all apparatus 100 in a certain geographic location or other suitable group could be provisioned with the same class key 106 and class diversifier value 118.

Once the certificate signing key 116 is recovered and the CSR 120 is validated, a device certificate 122 incorporating the public key 114 and other information from the CSR 120 is generated and signed using the recovered certificate signing key 116. Since the certificate signing key 116 is the same certificate signing key 152 used by the associated CA 150, the CA 150 may be indicated in the device certificate 122 as the issuing authority. Thus the device certificate 122 is automatically enrolled in the PKI of the CA 150 and may be trusted by any entity that can establish a trust relationship with the CA 150.

Generation of a trusted device certificate 122 within the SEE 124 allows the apparatus 100 to be enrolled in a PKI without the need for establishing secure communication with a CA and without the need for returning the device to a secure facility or creating a secure connection with a CA 150. Distributing CA capabilities as described above, allows devices such as the apparatus 100, to issue their own device certificates 122 thereby significantly reducing the cost and complexity of creating and enrolling device certificates.

All the operations for validating the CSR 120, recovering the certificate signing key 116, and issuing the device certificate 122 should be done atomically within a single secure service to guarantee that an attacker cannot eavesdrop on the certificate signing key 116 or issue unintentional device certificates 122. In certain embodiment it is desirable to take care to ensure that the certificate signing key 116 is never stored in the apparatus 100 and is discarded promptly after it is used. It may also be a good security practice to limit the function or procedure that is used to recover the certificate signing key 116 to the trusted application used to generate the device certificate 122 and ensure it is not distributed elsewhere.

The SEE 124 is configured to use a key derivation function (KDF) to derive an asymmetric key pair from key material and a salt. The HUK 108 provides the key material, and the device diversifier 110 provides the salt for deriving the device key pair 112, while the class key 106 provides the key material, and the class diversifier 118 provides the salt for recovering the certificate signing key 116. Derivation of asymmetric ECC type keys from key material and a salt value may be achieved for example by first using a hashed message authentication code (HMAC) algorithm with a hash algorithm such as the 256 bit secure hash algorithm (SHA-256) to obtain a key value, typically denoted as r, from the salt and key material. The key value r is then converted to an ECC integer private key. The associated public key can be obtained by multiplying the integer private key by G, where G is the base point of the selected elliptic curve. Alternatively the key value r may be obtained using any appropriate KDF such as password based key derivation function number 2 (PBKDS2) as defined in the conventional public key cryptography standards (PKCS). Alternatively, a KDF that produces RSA type cryptographic keys may be advantageously employed in the exemplary apparatus 100.

Those skilled in the art will readily recognize that the key derivation process used to derive the device key pair 112 may be different from the key derivation process used to derive the certificate signing key 116, and that the device key pair 112 may be based on a different cryptographic algorithm than the certificate signing key without straying from the spirit and scope of the disclosed embodiments. For example in one embodiment the device key pair 112 may use ECC while the certificate signing key may use RSA algorithms and vice versa.

Over the lifetime of an apparatus 100 it may be desirable to update the device certificate 122 and/or associate the apparatus with a different CA 160 belonging to a different PKI. To accomplish this, the class diversifier value 118 can be updated resulting in a different certificate signing key 116. Since the class diversifier value 118 is a public value, returning the device to a secure facility is not necessary for updating the class diversifier value 118. By selecting the new class diversifier value 118 such that the resulting certificate signing key 116 corresponds to the certificate signing key 162 associated with a second CA 160, the device certificate 122 which is signed with the new certificate signing key 116 is associated with the second CA 160 and may be verified using the public key 164 corresponding to the second CA 160. Similarly, the device key pair 112 may be changed by updating the device diversifier value 110.

Figure 2:
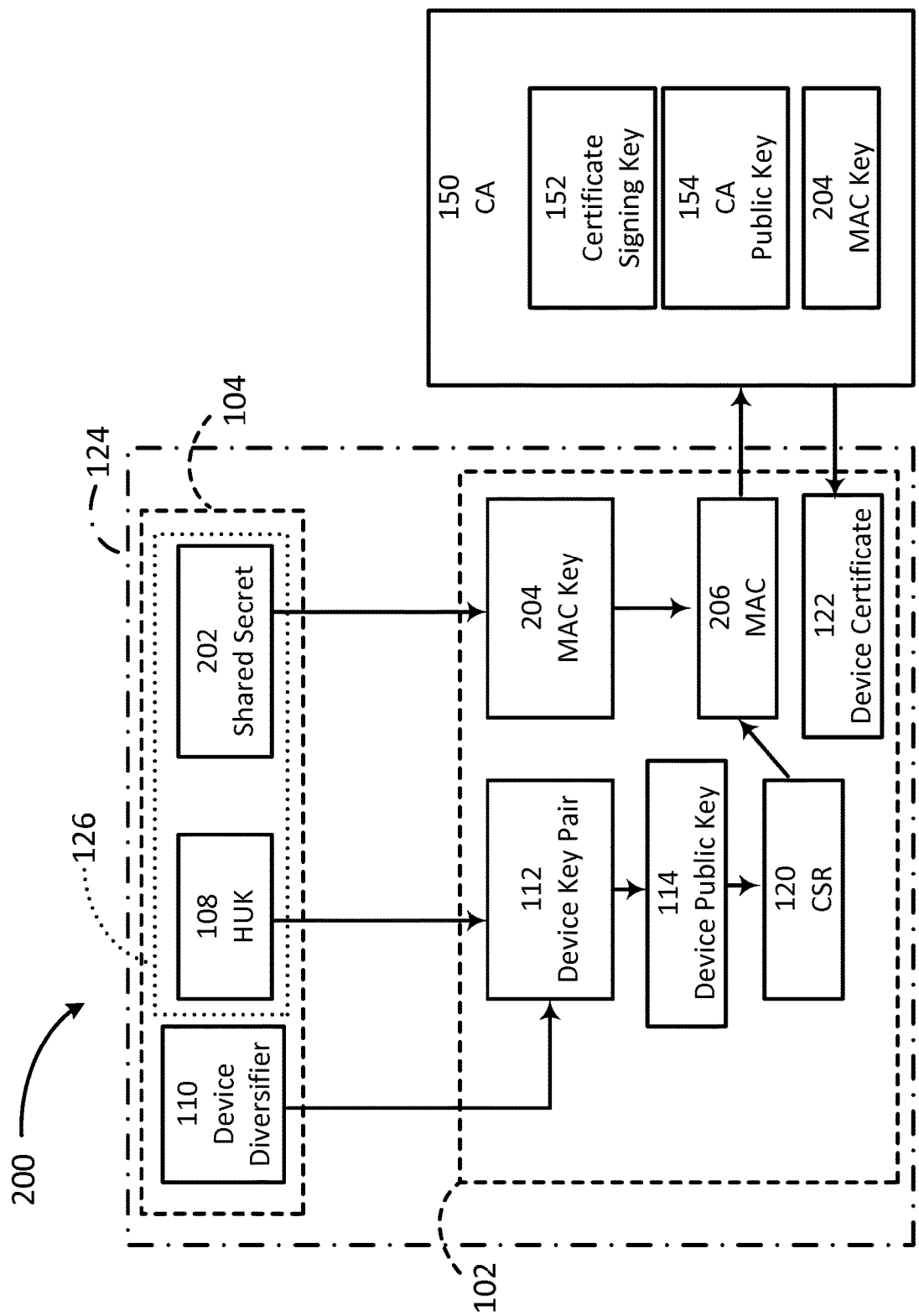
FIG. 2 illustrates a block diagram of an exemplary embodiment of an apparatus configured to internally generate a device key pair and certificate signing request incorporating aspects of the disclosed embodiments.

FIG. 2 illustrates a block diagram of an exemplary embodiment of an apparatus 200 configured to internally generate a device key pair 114 and CSR 120 and to receive a device certificate 122 from a CA 150. The apparatus 200 is similar to the apparatus 100 described above and includes a processor 102 coupled to a memory 104 where the memory has a secure memory portion 126, and the processor 102 and memory 104 are adapted to provide a SEE 124. In contrast with the apparatus 100 described above which generated the device certificate 122 within the SEE 124, the apparatus 200 delegates generation and signing of the device certificate 122 to an external CA 150.

The processor 102 of apparatus 200 derives a device key pair 112 using a suitable KDF based on a device diversifier value 110 and a HUK 108. The processor 102 extracts the public key 114 from the device key pair 112 and incorporates the public key 112 into a CSR along with subject information and additional data as desired. As above, the CSR can be in any suitable format such as a PKCS#10. However, in certain embodiments it is preferable to digitally sign the CSR 120 before transmitting it outside the SEE 124. The signed CSR 120 may then be transmitted to any desired CA 150.

When the communication channel between the SEE 124 and the CA 150 is not be fully secure or when a security policy requires, it is desirable to cryptographically secure the CSR 120 while it is being transferred to the CA 150. For this purpose, a shared secret 202 is loaded into secure memory 126 when the apparatus 200 is provisioned. The shared secret 202 may be a fully formed cryptographic key or alternatively may be any appropriate key material from which a suitable cryptographic key may be derived. A message authentication code (MAC) key 204, which may be a symmetric or secret key, is recovered from the shared secret 202 using any suitable KDF and used to generate a MAC 206 that is sent along with the CSR 120 to a CA 150. The CA 150 has access to the same MAC Key 204 used to generate the MAC 206 and can use the MAC Key 204 to validate the CSR 120. The CA 150 incorporates information from the CSR 120 into a device certificate 122 and signs the device certificate 122 using its certificate signing key 152. The device certificate 122 may then be sent back to the apparatus 200.

Recovering the MAC key 204 and generation of the MAC 206 enables a secure channel between the CA 150 and the SEE 124 based on the recovered MAC key 206. This secure channel ensures only specially customized CA 150 can provide device certificates 122. To improve security the CA 150 should be deployed as near as possible to the apparatus 200 in the facility where the apparatus 200 will be manufactured.

Figure 3:
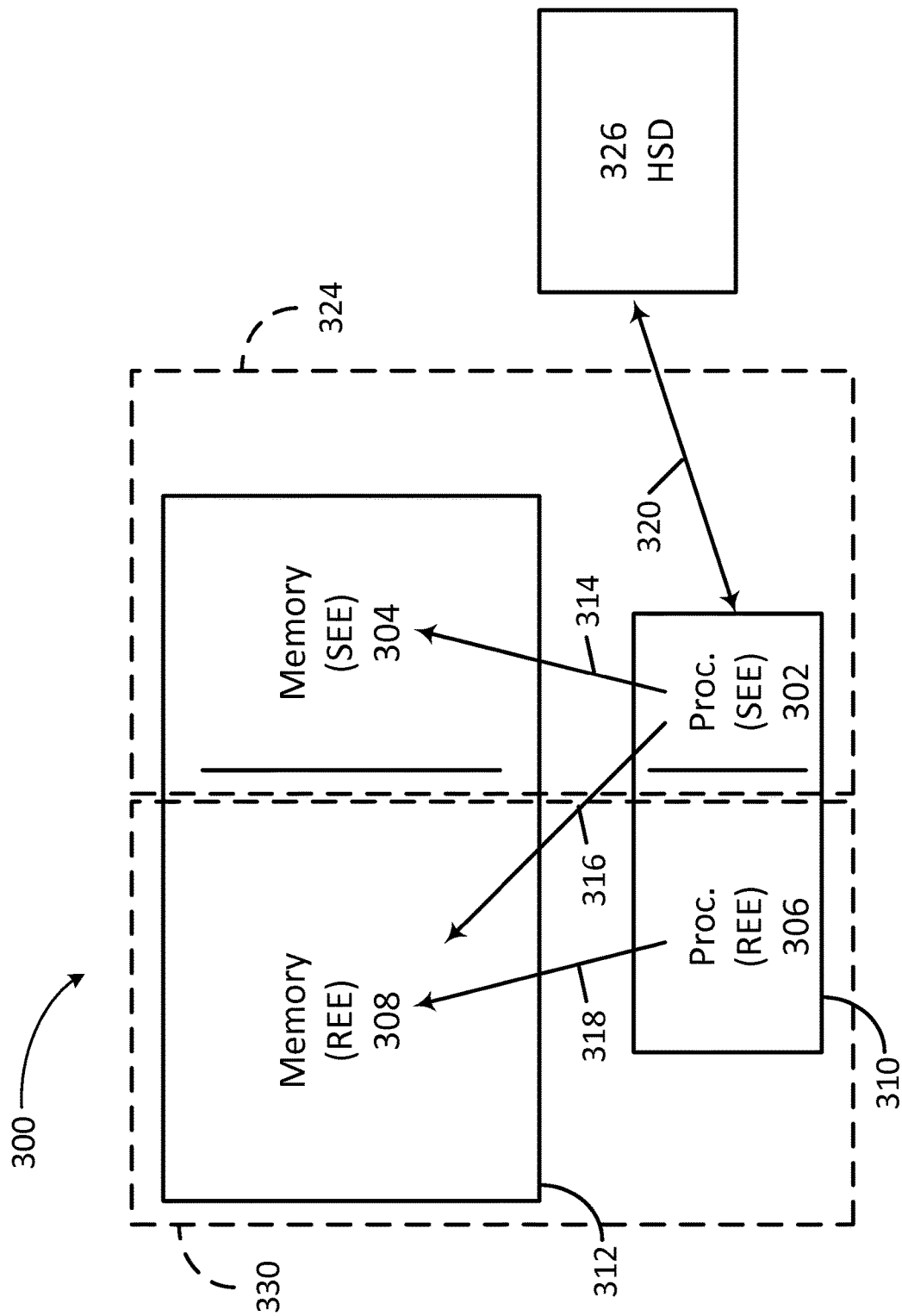
FIG. 3 illustrates a block diagram of an exemplary computing apparatus configured to provide a secure execution environment incorporating aspects of the disclosed embodiments.

FIG. 3 illustrates a block diagram of an exemplary computing apparatus 300 configured to provide a SEE 324 appropriate for use as the SEE 124 described above and with reference to FIG. 1 and FIG. 2. The computing apparatus 300 may be incorporated into various types of computing apparatus such as mobile phones, phablets, tablet computers, laptop computers, set top cable boxes, televisions, automobiles, etc., and can be advantageously employed to provide distributed CA functionality to enhance manufacturing and maintenance of the computing device 300. The computing apparatus 300 is adapted to provide both a SEE 324 and a rich execution environment (REE) 330.

The REE 330 is configured to provide a broad range of functionality and features to support a wide variety of applications and provide an enhanced user experience. However, the REE 330 is inherently less secure than the SEE 324 and cannot safely perform cryptographic operations without risking loss of confidentiality or integrity of the cryptographic keys and data. Examples of rich execution environments are those offered by mobile operating systems (OS) such as the Android OS developed by GOOGLE™, and iOS developed by APPLE™. In certain embodiments a REE (330) may not be desired and those skilled in the art will readily recognize that the computing apparatus 300 may be configured to provide a SEE 324 and not provide an associated REE 330 without straying from the spirit and scope of the present disclosure.

In the example of FIG. 3, the computing apparatus 300 includes a processor 310 coupled to a memory 312 where a first portion of the processor 302 and a first portion of the memory 304 are configured to support a SEE 324. A second portion of the processor 306 and a second portion of the memory 308 are configured to support a REE 330.

The processor 310 may be a single processing device or may comprise a plurality of processing devices including special purpose devices, such as for example, digital signal processing (DSP) devices, microprocessors, specialized processing devices, parallel processing cores, or general purpose computer processors. The processor 310 is configured to read program instructions from a memory 312 and perform the methods and processes described herein. The processor may also include a CPU working in tandem with a graphics processing unit (GPU) which may include a DSP or other specialized graphics processing hardware.

The memory 312 may be a combination of various types of volatile and non-volatile computer memory such as for example read only memory (ROM), random access memory (RAM), magnetic or optical disk, or other types of computer memory. The secure portion of memory 304 may include a one-time programmable memory configured to protect confidential data. The memory 312 stores computer program instructions that may be accessed and executed by the processor 310 to cause the processor to perform a variety of desirable computer implemented processes or methods such as the distributed CA operations or other cryptographic methods as described herein.

The SEE 324 is configured to ensure the confidentiality and integrity of data and computer programs stored within SEE memory 304, and to protect computer programs executing within the secure portion of the processor 302. The SEE 324 may be implemented for example using various technologies such as a trusted execution environment (TEE) or other suitable technology adapted to provide both a REE 330 and a SEE 324 within a computing device 300. In certain embodiments it may be desirable to protect sensitive key material or other sensitive cryptographic data using a separate hardware security device 326 or other physically secure processing apparatus such as a SE. Use of a hardware security device 326 may be desirable in certain embodiments based on security and other requirements imposed by a particular use or application.

To maintain a security boundary between the SEE 324 and REE 330 the REE portion of the processor 306 is allowed access 318 only to the REE portion of the memory 308. The SEE 324 is a secure environment and the SEE portion of the processor 302 is also allowed access to the REE portion of memory 308 and is also allowed access 314 to the SEE portion or secure portion of the memory 304. In embodiments where a HSD 326 is used the SEE portion of the processor 302 is allowed access to the HSD 326 while it may be desirable to prevent the REE portion of the processor 306 from accessing the HSD 326.

Figure 4:
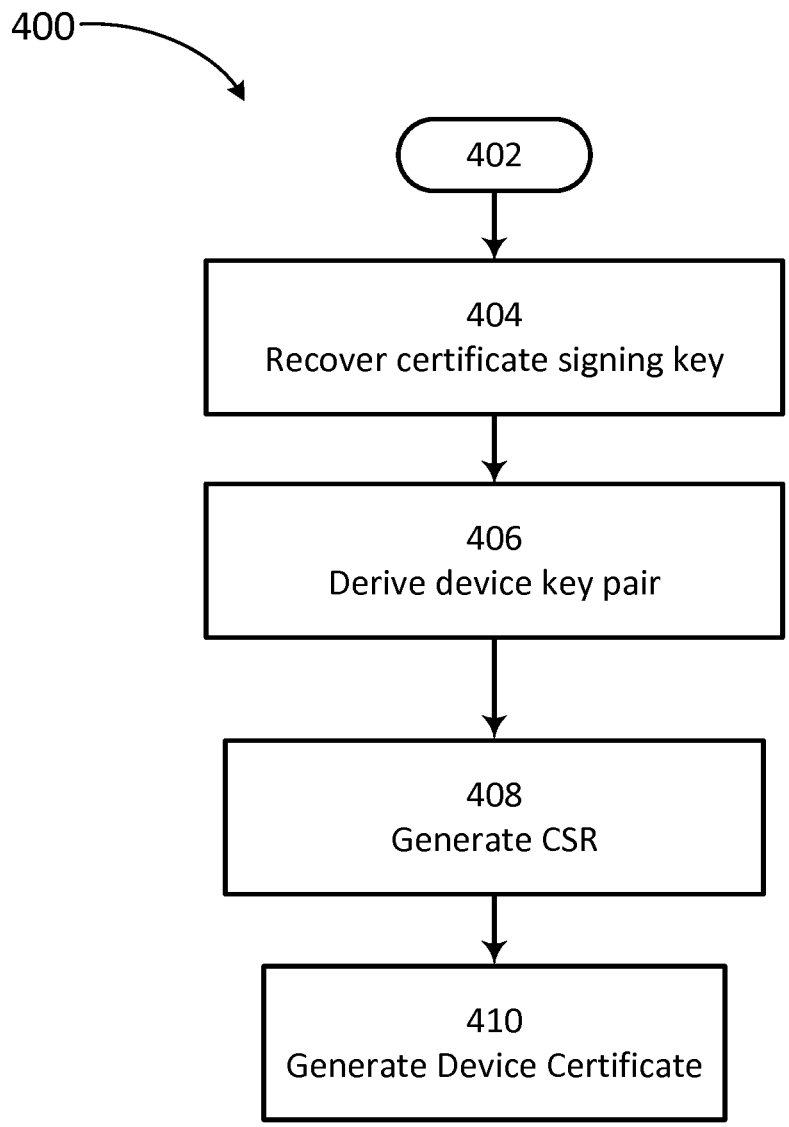
FIG. 4 illustrates a flow chart of an exemplary method for generating a device certificate according to one embodiment.

Referring to FIG. 4 there can be seen a flow chart of an exemplary method 400 for generating a device certificate for a computing device. The exemplary method 400 may be advantageously employed in any computing device that is configured to provide a SEE where the SEE is adapted to guarantee data and code loaded inside the SEE is protected with regard to confidentiality and integrity. For example, the computing device 300 described above and with reference to FIG. 3, and the apparatus 100 described above and with reference to FIG. 1 provide a suitably secure environments for executing the method 400. The principals and processes of the embodiments of apparatus as disclosed herein are also applicable to the methods disclosed in FIGS. 4 through 6 and described below.

The SEE or device in which the method 400 is executing is loaded 402 with confidential and other seed data. The seed data may be loaded 402 when the device is manufactured or provisioned and should be kept confidential such as by storing in a secure memory. Included in the seed data are a HUK and a class key. The HUK is confidential key material unique to a particular device or SEE such as the HUK 108 described above, and the class key is confidential key material known to all devices in a particular class or group and may be any suitable class key such as the class key 106 described above. The class key allows all devices in a certain class to recover the same certificate signing key, where the class could be any desired grouping of devices such as by type of device, company servicing the device, geographic locale, etc. It is advantageous in certain embodiments to load a device identifier into the SEE that uniquely identifies the device or SEE in which the method 400 is executing. The device identifier may be used for example to prevent issuing device certificates for unauthorized devices.

A certificate signing key is recovered 404 based on the class key. The recovered certificate signing key is the same certificate signing key used by an associated CA and is the private portion of an asymmetric key pair belonging to the associated CA. Thus a device certificate that is signed using the recovered 404 certificate signing key may be trusted by any entity that can establish a trust relationship with the associated CA, and the device certificate so signed may be considered automatically enrolled in the PKI of the associated CA. The recovered 404 certificate signing key may be any appropriate type of asymmetric key suitable for signing a device certificate.

A device key pair is derived 406 based on the HUK that was loaded 402 into the SEE. In certain embodiments it may be desirable to include a device identifier in the derivation 404 of the device key pair, thereby binding the key pair to a particular device identifier. When using a unique device identifier it is often beneficial to bind the device identifier to a particular apparatus or computing device and verify the device identifier before issuing the device certificate. The device key pair includes the device private key, which in many embodiments is kept confidential within the SEE, and a device public key which is published in the device certificate.

The method 400 generates 408 a certificate signing request (CSR) based on the device key pair and other identifying subject information, such as the device identifier, associated with a particular device. When a signed CSR format is employed, such as a standard PKCS#10 CSR, the device's private key may be used to digitally sign the CSR thereby allowing verification that the device creating the CSR has access to both the public key and corresponding private key of the asymmetric key pair. The digital signature may be created using any desired method such as the methods described in the public key cryptography standards (PKCS), the Digital Signature Algorithm (DSA) adopted by the United States Federal Information Processing Standard (FIPS) for digital signatures, or any other desired method or algorithm for generating an appropriate digital signature. Alternatively, when the device certificate is being created within the same SEE where the device key pair was generated, it may be desirable to skip the CSR signing process.

A device certificate is then generated 410 for the subject device. The device certificate, also referred to as a digital certificate, may be a conventional public key certificate such as the popular X.509 certificate, or alternatively it may be any desired type of public key certificate appropriate for authenticating and authorizing use of the device's public key. Before digitally signing the device certificate it is desired in certain embodiments to verify that the device id being incorporated into the device certificate matches the device id associated with the SEE. This verification step prevents a SEE from issuing certificates for other devices that may not be authorized by the associated CA. In certain embodiments it is desirable to load 402 a device diversifier value into the device. The device diversifier may be a public value and can be updated during the device lifecycle. The device diversifier can be used as cryptographic salt to add diversity to the HUK key material. This also allows the device key pair to be modified by changing the device diversifier value and performing the method a second time to generate a device certificate based on the updated device diversifier value. Similarly, a class diversifier value may be loaded 402 and used during recovery 404 of the certificate signing key. By selecting the class diversifier value such that the recovered 404 certificate signing key is associated with a new CA, the device can be enrolled in the PKI of the new CA by executing the method 400 after the class diversifier value has been updated.

Figure 5:
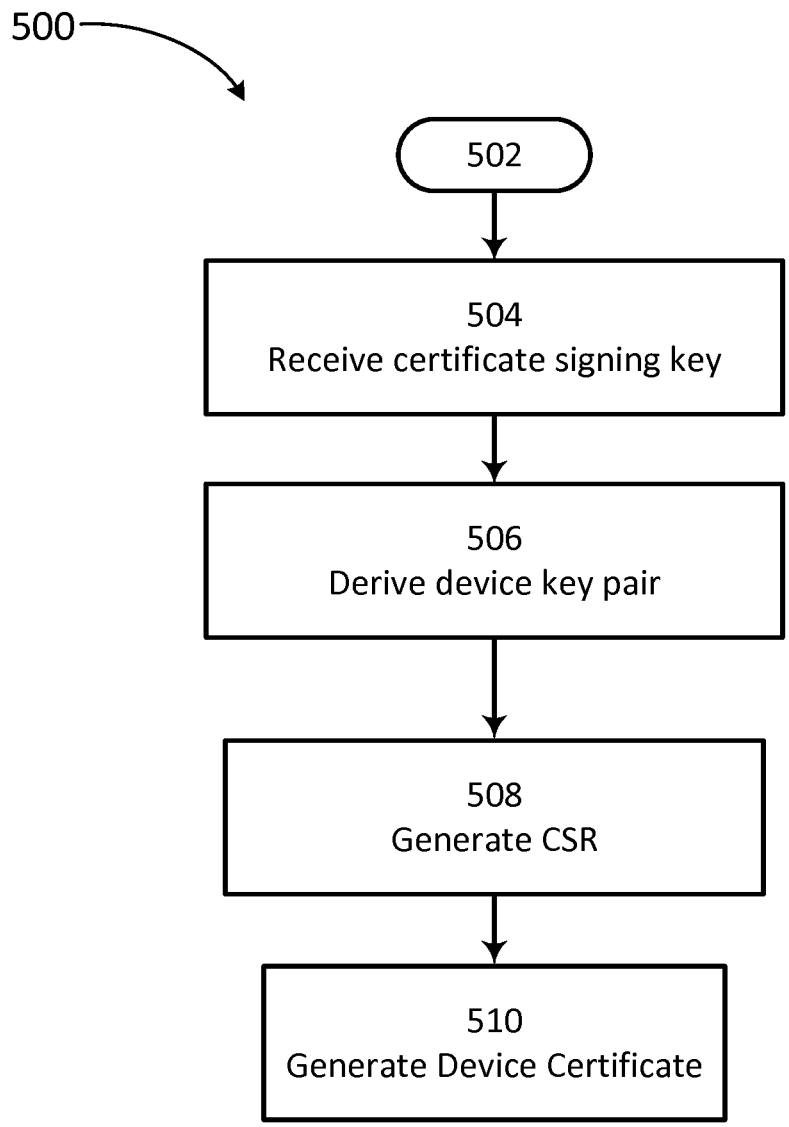
FIG. 5 illustrates a flow chart of an exemplary method for generating a device certificate according to one embodiment.

FIG. 5 illustrates a flow chart showing an exemplary method 500 for generating a device certificate according to aspects of the present disclosure. The exemplary method 500 may be advantageously employed in any computing device, such as a mobile phone or other mobile computing apparatus, which is configured to provide a SEE where the SEE is adapted to guarantee data and code loaded inside the SEE is protected with regard to confidentiality and integrity. For example, the computing device 300 described above and with reference to FIG. 3, and the apparatus 100 described above and with reference to FIG. 1 provide a suitably secure environments for executing the method 500.

The SEE or device in which the method 500 is executing is loaded 502 with confidential and other seed data. The seed data may be loaded 502 when the device is manufactured or provisioned and should be kept confidential such as by storing in a secure memory. Included in the seed data are a HUK which is confidential key material unique to a particular device or SEE such as the HUK 108 described above. It is advantageous in certain embodiments to load a device identifier into the SEE that uniquely identifies the device or SEE in which the method 500 is executing. The device identifier may be used for example to prevent issuing device certificates for unauthorized devices.

A certificate signing key is received 504 from a hardware security device coupled to the SEE and configured to securely communicate with the SEE. The received certificate signing key is the same certificate signing key used by an associated CA and includes at least the private portion of an asymmetric key pair belonging to the associated CA. Thus a device certificate that is signed using the received 504 certificate signing key may be trusted by any entity that can establish a trust relationship with the associated CA, and the device certificate so signed may be considered automatically enrolled in the PKI of the associated CA. The received 504 certificate signing key may be any appropriate type of asymmetric key suitable for signing a device certificate.

A device key pair is derived 506 based on the HUK that was loaded 502 into the SEE. In certain embodiments it may be desirable to include a device identifier in the derivation 504 of the device key pair, thereby binding the key pair to a particular device identifier. When using a unique device identifier it is often beneficial to bind the device identifier to a particular apparatus or computing device and verify the device identifier before issuing the device certificate. The device key pair includes the device private key, which in many embodiments is kept confidential within the SEE, and a device public key which may be published in the device certificate.

The method 500 generates 508 a CSR based on the device key pair and other identifying subject information, such as the device identifier, associated with a particular device. When a signed CSR format is employed, such as a standard PKCS#10 CSR, the device's private key may be used to digitally sign the CSR thereby allowing verification that the device creating the CSR has access to both the public key and corresponding private key of the asymmetric key pair corresponding to the CSR. As described above, the digital signature may be created using any desired method or algorithm appropriate for generating a digital signature. Alternatively, when the device certificate is being created within the same SEE where the device key pair was generated, it may be desirable to employ an unsigned CSR thereby reducing the amount of time and processing power necessary for CSR creation.

A device certificate is then generated 510 for the subject device. As described above, the device certificate may be any desired type of public key certificate appropriate for authenticating and authorizing use of the device's public key. Before digitally signing the device certificate it is desired in certain embodiments to verify that the device id being incorporated into the device certificate matches the device id associated with the SEE. This verification step prevents a SEE from issuing certificates for other devices that may not be authorized by the associated CA.

Figure 6:
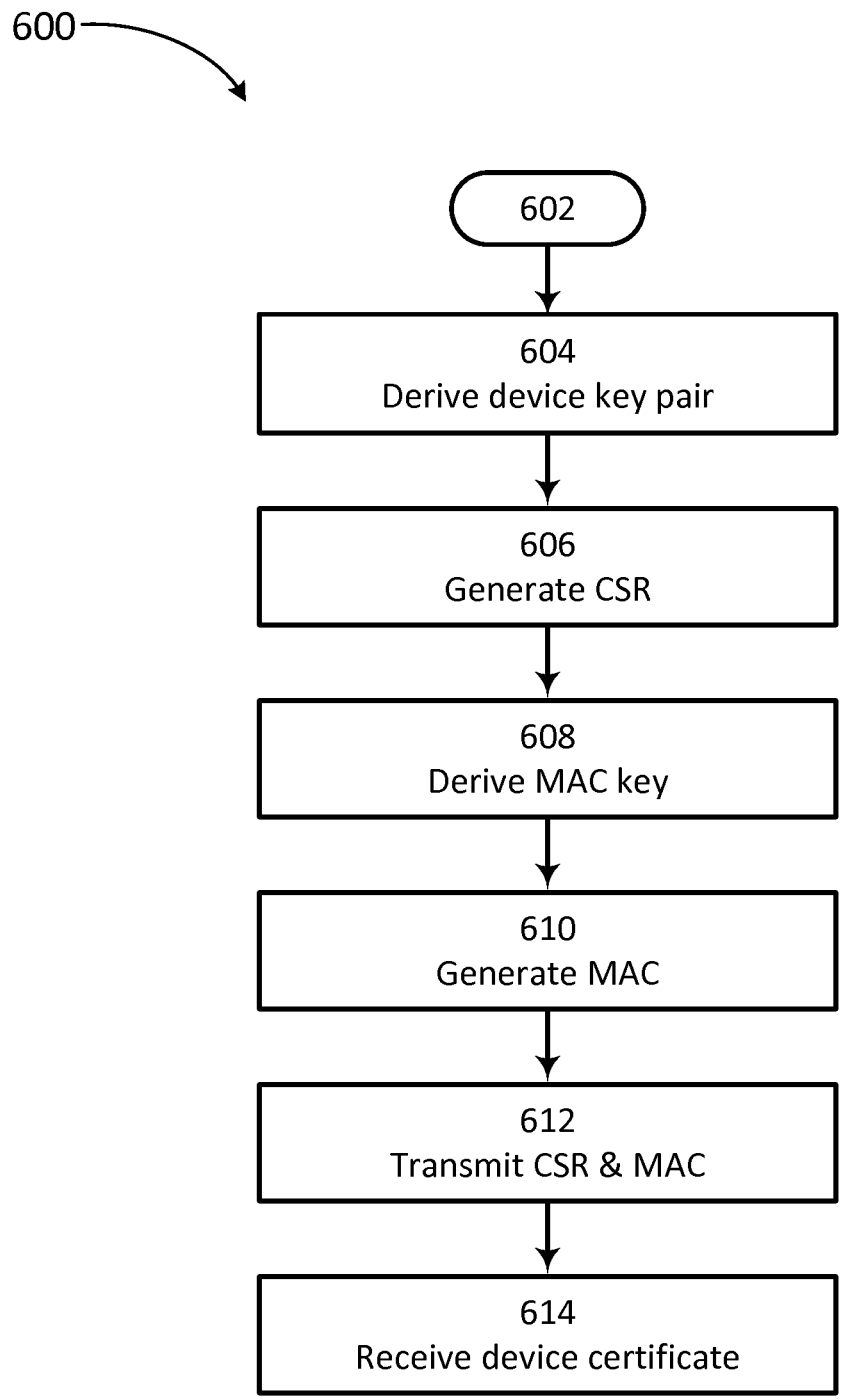
FIG. 6 illustrates a flow chart showing an exemplary method for obtaining a device certificate from a certificate authority according to one embodiment.

FIG. 6 illustrates a flow chart showing an exemplary method 600 for obtaining a device certificate from a CA according to aspects of the disclosed embodiments. The exemplary method 600 may be advantageously employed in various types of computing devices, such as a mobile phone or other mobile computing apparatus, which are configured to provide a SEE where the SEE is adapted to guarantee data and code loaded inside the SEE is protected with regard to confidentiality and integrity. For example, the computing device 300 described above and with reference to FIG. 3, and the apparatus 200 described above and with reference to FIG. 2 provide a suitably secure environments for executing the method 600.

The SEE or device in which the method 600 is executing is loaded 602 with confidential and other seed data. The seed data may be loaded 602 when the device is manufactured or provisioned and should be kept confidential such as by storing in a secure memory. Included in the seed data are a HUK which is confidential key material unique to a particular device or SEE such as the HUK 108 described above. It is advantageous in certain embodiments to load a device identifier into the SEE that uniquely identifies the device or SEE in which the method 600 is executing. The device identifier may be used for example to prevent issuing device certificates for unauthorized devices. In addition to the HUK, the seed data loaded 602 into secure memory includes a shared secret value, such as the shared secret value 202 described above with reference to FIG. 2.

A device key pair is derived 604 based on the HUK that was loaded 602 into the SEE. In certain embodiments it may be desirable to include a device identifier in the derivation 604 of the device key pair, thereby binding the key pair to a particular device identifier. When using a unique device identifier it is often beneficial to bind the device identifier to a particular apparatus or computing device and verify the device identifier before issuing the device certificate. The device key pair includes the device private key, which in many embodiments is kept confidential within the SEE, and a device public key which may be published in the device certificate.

The method 600 generates 606 a CSR based on the device key pair and other identifying subject information, such as the device identifier, associated with a particular device. It is preferable in the method 600 to employ a signed CSR format, such as a standard PKCS#10 CSR, where the device's private key is used to digitally sign the CSR thereby allowing verification that the device creating the CSR has access to both the public key and corresponding private key of the asymmetric key pair corresponding to the CSR. As described above, the digital signature may be created using any desired method or algorithm appropriate for generating a cryptographically secure digital signature.

A MAC key is derived 608 based on the shared secret stored in secure memory within the SEE. The MAC key may be any appropriate type of symmetric or asymmetric cryptographic key as desired. In certain embodiments deriving 608 a symmetric key is advantageous due to the reduced processing resources required by symmetric cryptographic algorithms. The MAC key is then used to generate 610 a MAC that may be used by a recipient of the CSR, such as a CA or other desired entity, to verify the integrity of the CSR.

The generated 606 CSR is then transmitted 612 along with the generated 610 MAC to a CA. The CA has access to the same shared secret used to derive the MAC key allowing it to verify integrity of the CSR prior to generating a device certificate. In certain embodiments it is advantageous to encrypt the CSR and MAC prior to transmission 612. The CA may then decrypt the CSR and MAC thereby ensuring confidentiality of the CSR during transmission 612. The CA generates a device certificate based on the CSR and sends it back to the originating apparatus. The device certificate is received 614 by the SEE where it is stored for later use. The method 600 results in providing a valid device certificate for the SEE in which the method 600 was executed.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. More-over, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus, comprising:
a memory comprising a hardware unique key, a class key and configured to store instructions and a class diversifier value, wherein the class diversifier value is a first public value; and
a processor coupled to the memory, wherein the processor and the memory are configured to provide a secure execution environment, and wherein the instructions cause the processor to be, in the secure execution environment, configured to:
recover a certificate signing key based on the class key and the class diversifier value, wherein the certificate signing key is associated with a certificate authority;
derive a device key pair based on the hardware unique key, wherein the device key pair comprises a device public key and a device private key;
generate a device certificate based on the device public key and the certificate signing key, wherein the device certificate is configured to be validated based on a public key associated with the certificate authority;
transmit the device certificate to the certificate authority;
upon determining to update the certificate signing key and the device certificate, obtain an updated class diversifier value, wherein the updated class diversifier value is a second public value;
recover an updated certificate signing key based on the updated class diversifier value and the class key, wherein the updated certificate signing key is associated with a second certificate authority and is updated using the updated class diversifier value and the class key without using the device public key and the device private key, and wherein the updated class diversifier value is not included in a certificate signing request to obtain an updated device certificate; and
generate the updated device certificate based on the updated certificate signing key and the device public key, wherein the updated device certificate is configured to be validated based on a second public key associated with the second certificate authority.

2. The apparatus of claim 1, wherein the instructions further cause the processor to be configured to:
generate the certificate signing request based on the device public key and the device private key; and
generate the device certificate based on the certificate signing request and the certificate signing key.

3. The apparatus of claim 1, wherein the memory further comprises a device diversifier value, and wherein the instructions further cause the processor to be configured to derive the device key pair based on the hardware unique key and the device diversifier value.

4. The apparatus of claim 3, wherein the instructions further cause the processor to be configured to:
update the device diversifier value;
derive an updated device key pair based on the hardware unique key and an updated device diversifier value, wherein the updated device key pair comprises an updated device public key and an updated device private key; and
generate an updated device certificate based on the updated device public key and the certificate signing key.

5. The apparatus of claim 1, wherein in a manner of recovering the certificate signing key, the instructions further cause the processor to be configured to recover the certificate signing key based on white box decryption.

6. The apparatus of claim 1, wherein in a manner of deriving the device key pair, the instructions further cause the processor to be configured to derive the device key pair based on white box decryption.

7. The apparatus of claim 1, wherein the apparatus is a mobile phone or a mobile computing device.

8. A method for generating a device certificate, wherein the method is performed within a secure execution environment of an apparatus, and wherein the method comprises:
recovering a certificate signing key based on a class key and a class diversifier value, wherein the certificate signing key is associated with a certificate authority, and wherein the class diversifier value is a first public value;
deriving a device key pair based on a hardware unique key, wherein the device key pair comprises a device public key and a device private key;
generating the device certificate based on the device public key and the certificate signing key, wherein the device certificate is configured to be validated based on a public key associated with the certificate authority;
transmitting the device certificate to the certificate authority;
upon determining to update the certificate signing key and the device certificate, obtaining an updated class diversifier value, wherein the updated class diversifier value is a second public value, and wherein the updated class diversifier value is not included in a certificate signing request to obtain an updated device certificate;
recovering an updated certificate signing key based on the updated class diversifier value and the class key, wherein the updated certificate signing key is associated with a second certificate authority and is updated using the updated class diversifier value and the class key without using the device public key and the device private key; and
generating an updated device certificate based on the updated certificate signing key and the device public key, wherein the updated device certificate is configured to be validated based on a second public key associated with the second certificate authority.

9. The method of claim 8, wherein deriving the device key pair further comprises deriving the device key pair based on the hardware unique key and a device diversifier value.

10. The method of claim 9, further comprising:
updating the device diversifier value;
deriving an updated device key pair based on the hardware unique key and an updated device diversifier value, wherein the updated device key pair comprises an updated device public key and an updated device private key; and
generating an updated device certificate based on the updated device public key and the certificate signing key.

11. The method of claim 8, further comprising:
generating the certificate signing request based on the device public key and the device private key; and generating the device certificate based on the certificate signing request and the certificate signing key.

12. The method of claim 8, wherein recovering the certificate signing key further comprises recovering the certificate signing key based on white box decryption.

13. The method of claim 8, wherein deriving the device key pair further comprises deriving the device key pair based on white box decryption.

14. A computer program product comprising a non-transitory computer-readable medium storing computer executable instructions, wherein when the computer executable instructions are executed by a processor, cause the processor to:
  recover a certificate signing key based on a class key and a class diversifier value, wherein the certificate signing key is associated with a certificate authority, and wherein the class diversifier value is a first public value;
  derive a device key pair based on a hardware unique key, wherein the device key pair comprises a device public key and a device private key;
  generate a device certificate based on the device public key and the certificate signing key, wherein the device certificate is configured to be validated based on a public key associated with the certificate authority;
  transmit the device certificate to the certificate authority;
  upon determining to update the certificate signing key and the device certificate, obtain an updated class diversifier value, wherein the updated class diversifier value is a second public value;
  recover an updated certificate signing key based on the updated class diversifier value and the class key, wherein the updated certificate signing key is associated with a second certificate authority and is updated using the updated class diversifier value and the class key without using the device public key and the device private key, and wherein the updated class diversifier value is not included in a certificate signing request to obtain an updated device certificate; and
  generate the updated device certificate based on the updated certificate signing key and the device public key, wherein the updated device certificate is configured to be validated based on a second public key associated with the second certificate authority.

15. The computer program product of claim 14, wherein the computer executable instructions further cause the processor to:
  generate the certificate signing request based on the device public key and the device private key; and
  generate the device certificate based on the certificate signing request and the certificate signing key.

16. The computer program product of claim 14, wherein in a manner of recovering the certificate signing key, the computer executable instructions further cause the processor to recover the certificate signing key based on white box decryption.

* * * * *